Patented June 9, 1925.

1,541,753

UNITED STATES PATENT OFFICE.

GEORGE ETHELBERT SANDERS, OF ANNAPOLIS ROYAL, NOVA SCOTIA, CANADA, ASSIGNOR TO RICHES, PIVER & CO., A CORPORATION OF NEW JERSEY.

PROCESS OF MAKING AN INSECTICIDE AND A FUNGICIDE.

No Drawing.   Application filed December 23, 1920.   Serial No. 432,692.

*To all whom it may concern:*

Be it known that I, GEORGE E. SANDERS, a subject of Great Britain, and resident of Annapolis Royal, Nova Scotia, Canada, have invented certain new and useful Improvements in Processes of Making an Insecticide and a Fungicide, of which the following is a specification.

The subject matter of this invention is a process of making a fungicide and an insecticide, either one or both combined or mixed, in the form of a fine powder or dust, according to the use to which it is to be put. In some cases there is an advantage in having both available for use and application to vegetation in one operation.

Copper forms the basis of an effective fungicide and arsenic of an insecticide.

One of the features of this invention is in extracting the water of crystallization from copper sulphate crystals by chemical means to produce a dehydrated copper sulphate which, when mixed with lime, forms a very effective fungicide in powder form, in which form the copper is very effective for the purpose and is economical in cost. The copper sulphate applied without lime as a wet spray will injure foliage but is harmless when applied as a powder or dust with lime.

Another object of the invention is to provide a process of making commercial arsenate (or arsenite) of lime, which is not only useful as an insecticide but also for other purposes.

The principles and steps involved may be briefly stated as follows:

Calcium oxide or stone lime (CaO) has great affinity for water and when brought into contact with a solution of arsenic acid in water produces a hydrated lime, $Ca(OH)_2$, containing a certain proportion of arsenate of lime. This action (slacking the lime) generates heat and when copper sulphate crystals are present or added during the operation of slacking, the heat, together with the affinity of the lime for water, causes a dehydration of the copper salt, the water of the copper sulphate crystals being taken up by the slacking lime. It will of course be understood that in the above process all of the arsenic acid or arsenious acid is neutralized by the lime, and that the latter is sufficiently in excess to dehydrate also the copper sulphate crystals which are added.

The result of the first part of the above operation is the production of a certain amount of commercial arsenate of lime, or calcium arsenate, $Ca_3(AsO_4)_2$, depending on the amount of arsenic acid used, or if arsenious acid is used calcium arsenite will be produced, in the form of a fine powder, which is useful as an insecticide and for other purposes.

I have also found that when copper sulphate crystals are ground together with calcium oxide a similar action of dehydration takes place and a dehydrated copper sulphate, in the form of a fine powder, is produced, which is useful as a fungicide, when mixed with lime.

I have found that in place of copper sulphate crystals, copper sulphate in solution may be used, the dehydration of the copper sulphate being facilitated by the liquid form in its contact with the lime. In this case also it should be understood that sufficient lime is added to take up all of the water.

In some cases it is desirable to produce a combined insecticide and fungicide in fine powder form and I have found that this may be accomplished by an automatic and continuous process in a simple manner by hydrating lime with arsenic (or arsenious) acid and water, conveying the same while hydrating to a mixer into which is simultaneously introduced dehydrated copper sulphate formed by mixing, preferably by grinding together copper sulphate crystals and calcium oxide. This produces a mixture, in fine powder form, of commercial arsenate of lime, $Ca_3(AsO_4)_2$, (or arsenite of lime when arsenious acid is used); hydrated lime, $Ca(OH)_2$; and dehydrated copper sulphate, $CuSO_4$; which forms a combined insecticide and fungicide, the proportions of each being dependent upon the amount of water, arsenic acid, copper sulphate and lime used, according to the particular use for which the mixture is intended. An example of a composition which has been successful for treating potatoes is 15% dehydrated copper sulphate, 8% arsenate of lime, and 77% hydrated lime.

It will be understood that, for the purpose of economy of cost, etc., a commercial copper sulphate is used and the dehydration does not necessarily consist in the removal of all of the water of crystallization, also that other salts may be substituted for the arsenic acid, such as sodium arsenate, calcium arsenate, etc.

In fact I contemplate that various changes may be made and other substances used according to the principles herein set out without departing from the spirit and purpose of the invention and it is intended that the particular substances and reactions herein described shall be considered as illustrative merely of the invention and not in a limiting sense.

What I claim is:

1. The process of producing a mixture in powder form adapted for use as an insecticide and fungicide, which consists in hydrating calcium oxide with a solution of arsenic acid and mixing the same with dehydrated copper sulphate, the calcium oxide being present in quantity sufficient to take up all of the free water.

2. The process of producing a mixture in powder form adapted for use as an insecticide and fungicide, which consists in hydrating calcium oxide with a solution of an arsenic compound and mixing the same with dehydrated copper sulphate, the calcium oxide being present in quantity sufficient to take up all of the free water.

3. The process of producing a mixture in powder form adapted for use as an insecticide and fungicide, which consists in hydrating calcium oxide with a solution of an arsenic compound and simultaneously mixing the same with copper sulphate, the calcium oxide being present in quantity sufficient to take up all of the free water.

4. The process of making an insecticide and fungicide, comprising the hydration of calcium oxide with a solution of arsenic acid and adding copper sulphate thereto while hydrating, the calcium oxide being kept always in excess to an amount sufficient to cause a dehydration of the copper sulphate, producing a mixture in dry powder form containing arsenate of lime and dehydrated copper sulphate.

Signed October 28, 1920.

GEORGE ETHELBERT SANDERS.